United States Patent
Kawasaki

(10) Patent No.: US 11,667,347 B2
(45) Date of Patent: Jun. 6, 2023

(54) SADDLE-RIDING TYPE VEHICLE

(71) Applicant: HONDA MOTOR CO., LTD., Tokyo (JP)

(72) Inventor: Yohei Kawasaki, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 109 days.

(21) Appl. No.: 17/186,014

(22) Filed: Feb. 26, 2021

(65) Prior Publication Data

US 2021/0291931 A1 Sep. 23, 2021

(30) Foreign Application Priority Data

Mar. 18, 2020 (JP) .............................. JP2020-048311

(51) Int. Cl.
| | |
|---|---|
| B62K 25/10 | (2006.01) |
| B62J 35/00 | (2006.01) |
| B62J 45/42 | (2020.01) |
| B62K 25/04 | (2006.01) |

(52) U.S. Cl.
CPC .............. *B62K 25/10* (2013.01); *B62J 35/00* (2013.01); *B62J 45/42* (2020.02); *B62K 2025/044* (2013.01)

(58) Field of Classification Search
CPC .... B62K 25/10; B62K 2025/044; B62J 45/42; B62J 35/00
See application file for complete search history.

(56) References Cited

U.S. PATENT DOCUMENTS 7,722,072 B2* 5/2010 Hoogendoorn ...... B62K 25/286
280/284
8,439,383 B2* 5/2013 Talavasek .............. B62K 21/02
280/285

(Continued)

FOREIGN PATENT DOCUMENTS

JP 07-208529 8/1995
JP 3154637 9/2009

(Continued)

OTHER PUBLICATIONS

Japanese Office Action for Japanese Patent Application No. 2020-048311 dated Jan. 25, 2022.

(Continued)

*Primary Examiner* — Kevin Hurley
*Assistant Examiner* — Michael R Stabley
(74) *Attorney, Agent, or Firm* — Amin, Turocy & Watson, LLP

(57) ABSTRACT

A saddle-riding type vehicle includes: a vehicle body frame; a swing arm supported in a swingable manner with respect to a pivot frame of the vehicle body frame; and a rear suspension in which a link arm supported by the swing arm and the pivot frame are coupled, and damping is controlled by a hydraulic oil. In addition, the saddle-riding type vehicle includes: a sub-tank provided in the rear suspension and storing the hydraulic oil; and a detection sensor that detects behavior of a vehicle body while traveling. Moreover, in a top view of the saddle-riding type vehicle viewed from above, the sub-tank and the detection sensor are disposed so as to overlap with each other.

7 Claims, 4 Drawing Sheets

(56) References Cited

U.S. PATENT DOCUMENTS

| | | | |
|---|---|---|---|
| 8,550,223 B2 * | 10/2013 | Cox | F16F 9/18 |
| | | | 188/322.22 |
| 8,579,064 B2 | 11/2013 | Oohashi et al. | |
| 8,960,389 B2 * | 2/2015 | McAndrews | B62K 25/08 |
| | | | 188/322.22 |
| 9,221,513 B2 * | 12/2015 | Hoogendoorn | B62K 25/286 |
| 9,499,234 B2 * | 11/2016 | Tetsuka | B62M 25/08 |
| 9,969,458 B2 * | 5/2018 | Yoshida | B62K 25/10 |
| 10,124,644 B2 | 11/2018 | Kurita | |
| 10,328,764 B2 * | 6/2019 | Murakami | B62K 25/283 |
| 10,807,670 B2 * | 10/2020 | Krugman | B62K 25/02 |
| 2012/0299268 A1 * | 11/2012 | Chamberlain | B62K 25/286 |
| | | | 280/284 |
| 2013/0025987 A1 * | 1/2013 | Batterbee | F16F 9/53 |
| | | | 188/267.2 |
| 2013/0081273 A1 * | 4/2013 | McAndrews | F16F 9/3271 |
| | | | 29/896.91 |
| 2017/0088210 A1 | 3/2017 | Azuma et al. | |
| 2018/0304952 A1 | 10/2018 | Krugman et al. | |

FOREIGN PATENT DOCUMENTS

| | | |
|---|---|---|
| JP | 2014-201173 | 10/2014 |
| JP | 2015-205646 | 11/2015 |
| JP | 6613092 | 11/2019 |

OTHER PUBLICATIONS

Japanese Office Action for Japanese Patent Application No. 2020-048311 dated Jul. 26, 2022.

* cited by examiner

SADDLE-RIDING TYPE VEHICLE

CROSS-REFERENCE TO RELATED APPLICATION

This application is based upon and claims the benefit of priority from Japanese Patent Application No. 2020-048311 filed on Mar. 18, 2020, the contents of which are incorporated herein by reference.

BACKGROUND OF THE INVENTION

Field of the Invention

The present invention relates to a saddle-riding type vehicle having a sensor that detects behavior of a vehicle body and performing control of a suspension based on a detection signal of the sensor.

Description of the Related Art

There is known from the past a saddle-riding type vehicle installed with a vehicle body behavior sensor for detecting behavior of a vehicle body while traveling (refer to Japanese Patent No. 6613092, for example). This saddle-riding type vehicle includes: a front wheel and a rear wheel; an engine disposed between the front wheel and the rear wheel; a fuel tank disposed above the engine; and an air cleaner box disposed between the engine and the fuel tank, wherein the vehicle body behavior sensor is housed in a recess provided in an upper wall surface of the air cleaner box facing the fuel tank.

Such a vehicle body behavior sensor, which is provided for detecting vehicle body behavior such as inclination or acceleration of the vehicle body while traveling, is generally capable of detecting more highly accurate behavior by being disposed in a position close to a center-of-gravity of the vehicle body, hence it is desirable for the vehicle body behavior sensor to be disposed in a position closer to the center-of-gravity.

SUMMARY OF THE INVENTION

A general object of the present invention is to provide a saddle-riding type vehicle that enables a sensor to be disposed in a position closer to a center-of-gravity of a vehicle body and behavior of the vehicle body to be more highly accurately detected.

An aspect of the present invention is a saddle-riding type vehicle including: a vehicle body frame; a suspension in which a swing arm supported in a swingable manner with respect to the vehicle body frame and the vehicle body frame are coupled, and damping is controlled by a hydraulic oil; a tank unit provided in the suspension and storing the hydraulic oil; and a sensor that detects behavior of a vehicle body while traveling, wherein, in a top view of the saddle-riding type vehicle, the tank unit and the sensor are disposed so as to overlap with each other.

Due to the present invention, a saddle-riding type vehicle includes a suspension in which a swing arm supported in a swingable manner with respect to a vehicle body frame and the vehicle body frame are coupled, and damping is controlled by a hydraulic oil, wherein a tank unit provided in the suspension and storing the hydraulic oil, and a sensor that detects behavior of a vehicle body while traveling, are disposed so as to overlap with each other in a top view of the saddle-riding type vehicle.

Thus, by the sensor being disposed coming close to the suspension which is provided in a vicinity of a center-of-gravity of the saddle-riding type vehicle, and, moreover, by the sensor being disposed so as to overlap with the tank unit which stores the hydraulic oil and has an increased weight, the sensor can be disposed closer to the center-of-gravity. As a result, it becomes possible for behavior of the vehicle body to be more highly accurately detected by the sensor disposed closer to the center-of-gravity of the saddle-riding type vehicle.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

Figure 1:
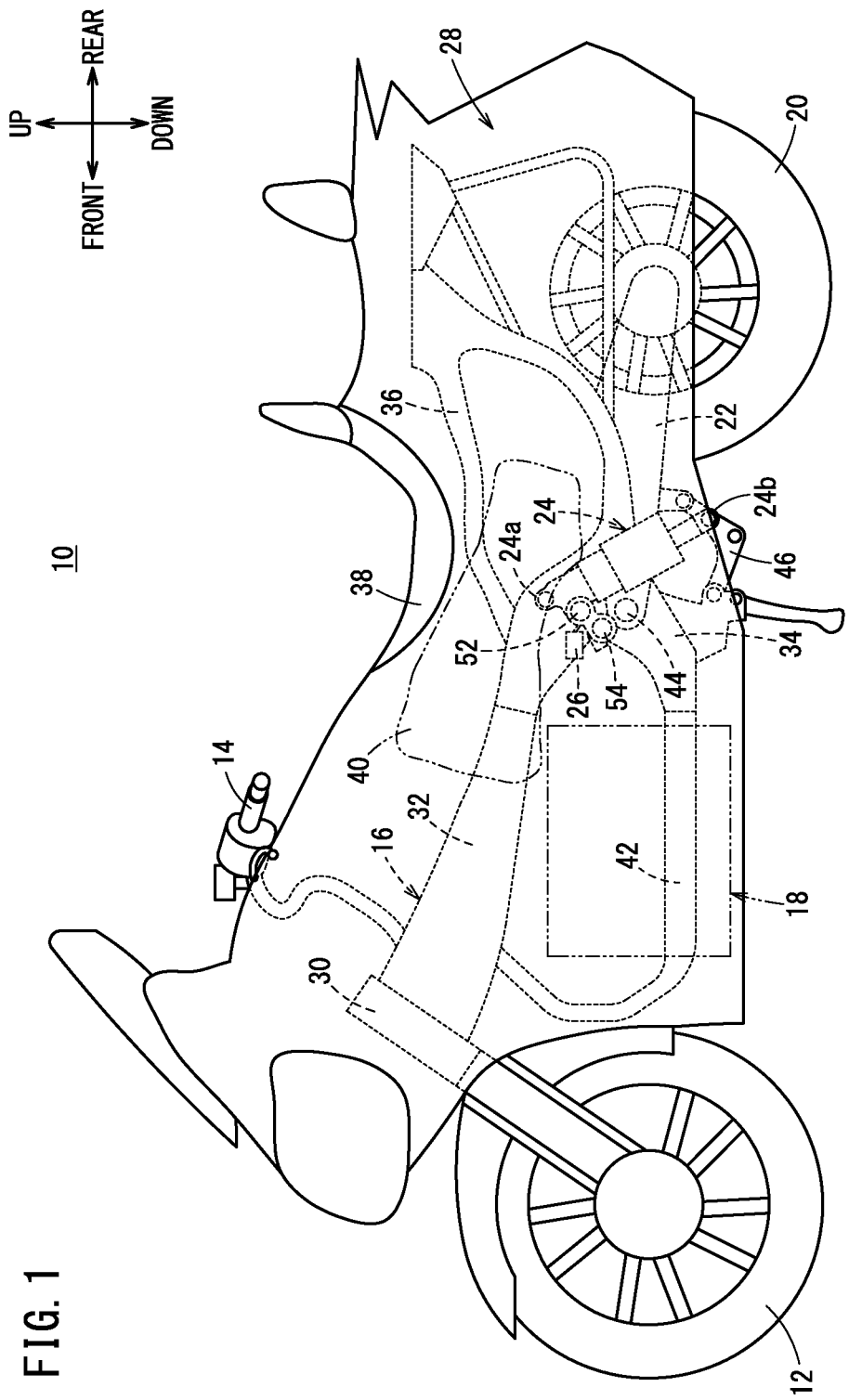
FIG. 1 is a left side view of a saddle-riding type vehicle according to an embodiment of the present invention.

As shown in FIG. 1, this saddle-riding type vehicle 10 includes: a front wheel 12 being a control wheel; a handlebar 14 for controlling the front wheel 12; a vehicle body frame 16 configuring a vehicle body; an engine 18 being a power source; a rear wheel 20 being a drive wheel; a rear suspension (a suspension) 24 that connects a swing arm 22 supporting the rear wheel 20, and the vehicle body frame 16; and a detection sensor (a sensor) 26 for detecting behavior of the vehicle body. The vehicle body frame 16 is covered by a vehicle body cover 28. FIG. 1 is a left side view of a saddle-riding type motorcycle being one example of the above-mentioned saddle-riding type vehicle 10. Moreover, in the description of the present embodiment, description will be given assuming that a front-rear direction, a left-right direction (a vehicle width direction), and an up-down direction accord with directions observed by a driver seated on the saddle-riding type vehicle 10.

Figure 2:
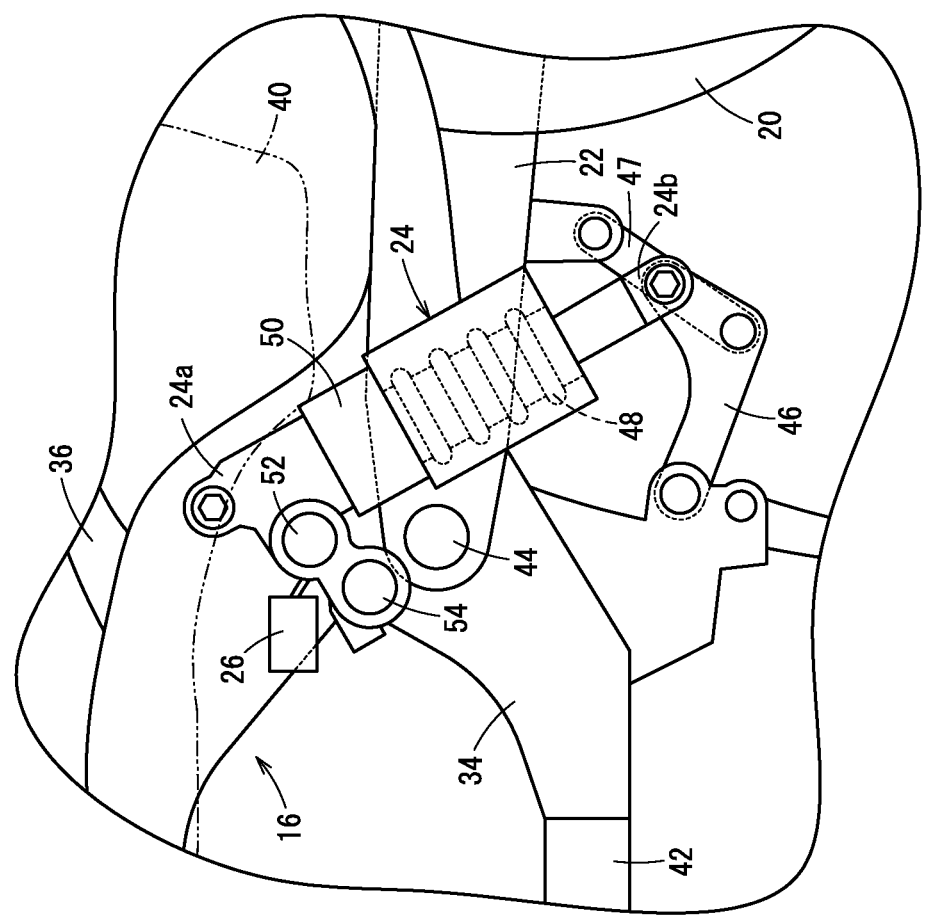
FIG. 2 is an enlarged side view of a vicinity of a rear suspension in the saddle-riding type vehicle shown in FIG. 1.

As shown in FIGS. 1 and 2, the vehicle body frame 16 has: a main frame 32 extending downwardly and rearwardly from a head pipe 30 of a vehicle body front portion; and a pivot frame (a vehicle body frame) 34 connected to a rear end of the main frame 32. A seat frame 36 whose front end is connected to the pivot frame 34 extends obliquely upwardly rearwards. Moreover, an upper portion of the seat frame 36 is provided with a seat 38 on which the driver is seated.

Moreover, the main frame 32 extends branching in a two-pronged fork-shape manner in the vehicle width direction, rearwardly from the head pipe 30. A fuel tank 40 is disposed between its branches, and stores a fuel to be supplied to the engine 18. The fuel tank 40, which is formed in a shape of a box having a certain capacity inside, is provided extending in the front-rear direction at a position of a lower portion of the seat 38.

Furthermore, a lower portion of the main frame 32 is provided with a pair of lower frames 42 branching rearwardly in a two-pronged fork-shape manner in the vehicle width direction, which hold the engine 18. The rear ends of the lower frames 42 are connected to the pivot frame 34.

The pivot frame 34 has its front end branching in a two-pronged fork-shape manner in the up-down direction, has the main frame 32 connected to its upper portion side, and has the lower frames 42 connected to its lower portion side. Moreover, a rear end of the pivot frame 34 has a front end of the swing arm 22 axially supported thereby, in a swingable manner upwardly/downwardly, by a pivot shaft 44, and has coupled thereto at a position upward of the pivot shaft 44 a later-mentioned one end portion 24a of the rear suspension 24.

The swing arm 22, which is a cantilever structure that extends rearwardly from the pivot shaft 44 and is supported in a swingable manner by the pivot shaft 44 alone, has the rear wheel 20 supported in a freely rotating manner by its rear end, and has a link arm 46 connected thereto at a position between its front end and its rear end.

As shown in FIG. 2, the link arm 46 has its front end axially supported in a freely revolving manner with respect to a lower end of the pivot frame 34, and has its rear end side bending upwardly with respect to its front end to be axially supported in a freely revolving manner with respect to the rear suspension 24. Note that a rear end of a link rod 47 is connected to a position more to a front end side than a center along an extension direction of the swing arm 22. Moreover, the link arm 46 has a front end of the link rod 47 connected thereto substantially at its bent central portion.

As a result, the link arm 46 is connected in a freely revolving manner with respect to the pivot frame 34 and the link rod 47, and its rear end side is enabled to swing with its front end supported by the pivot frame 34 as a fulcrum, by the rear suspension 24 being expanded/contracted, due to swinging of the swing arm 22.

The rear suspension 24, which is a hydraulic (oil pressure) control type suspension enabling damping to be freely controlled by hydraulic pressure, for example, includes: a coil spring 48 and a hydraulic damper 50; a solenoid valve 52 that controls a flow rate of a hydraulic oil of the hydraulic damper 50; and a sub-tank (a tank unit) 54 that stores in advance a certain amount of the hydraulic oil. The coil spring 48 is provided surrounding an outer peripheral side of the hydraulic damper 50.

The hydraulic damper 50 has on its inside a cylinder chamber (not illustrated) filled with the hydraulic oil, and is provided with a piston rod joined to a piston provided in a free-stroke manner in an axial direction along the cylinder chamber, the piston rod being provided exposed to outside. Moreover, one end portion of the hydraulic damper 50 is coupled at a position upward of the pivot shaft 44 to the pivot frame 34, and its other end portion being an end portion of the unillustrated piston rod is coupled, disposed downwardly rearwards, to the link arm 46.

That is, the rear suspension 24 including the hydraulic damper 50 is coupled to the vehicle body frame 16 in a forwardly inclined state of being inclined at a certain angle in such a manner that its one end portion 24a will be directed upwardly forwards, and its another end portion 24b will be directed downwardly rearwards.

Figure 3:
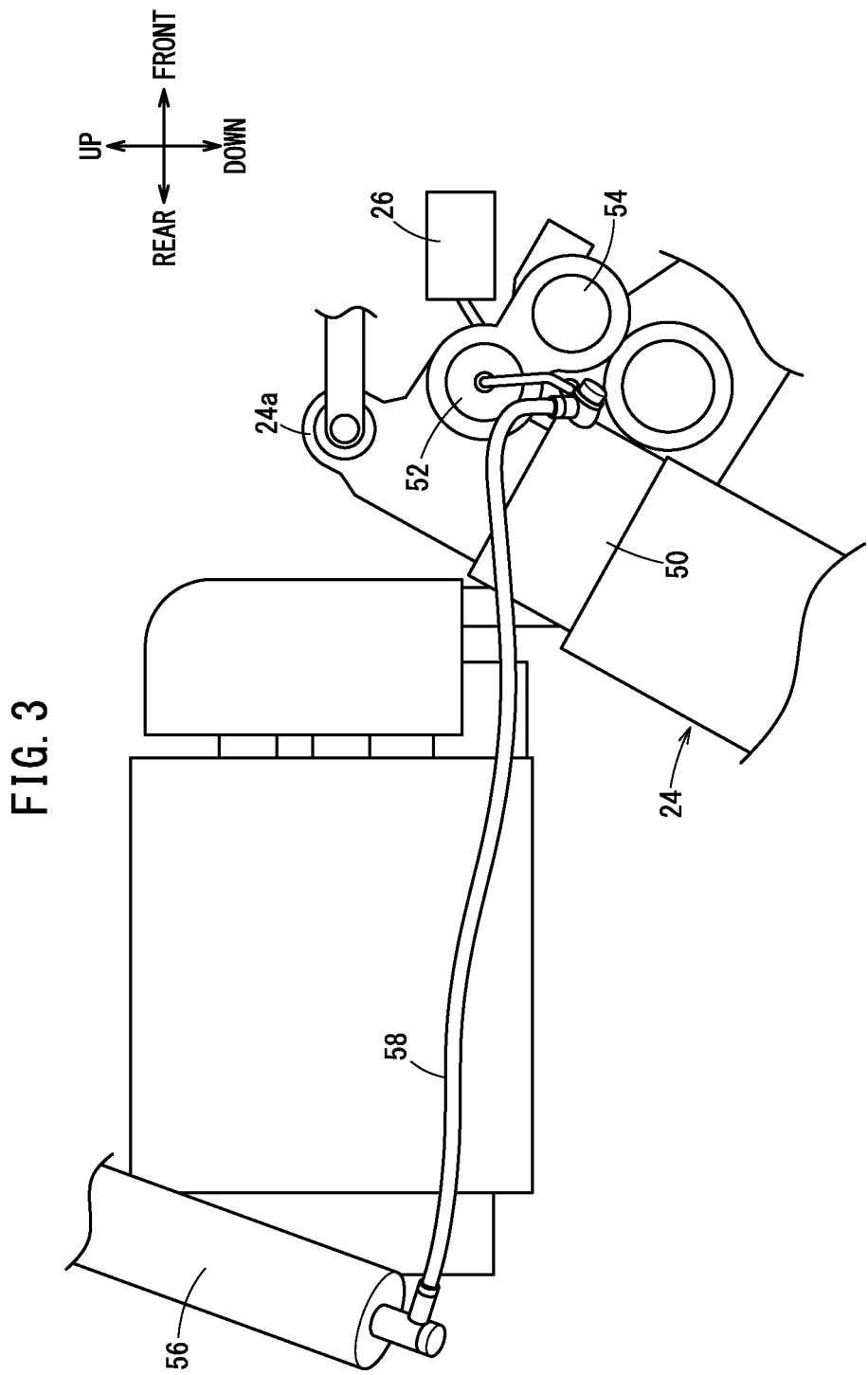
FIG. 3 is an enlarged right side view showing a vicinity of a hydraulic hose connecting the rear suspension shown in FIG. 2 and a reservoir tank.
Figure 4:
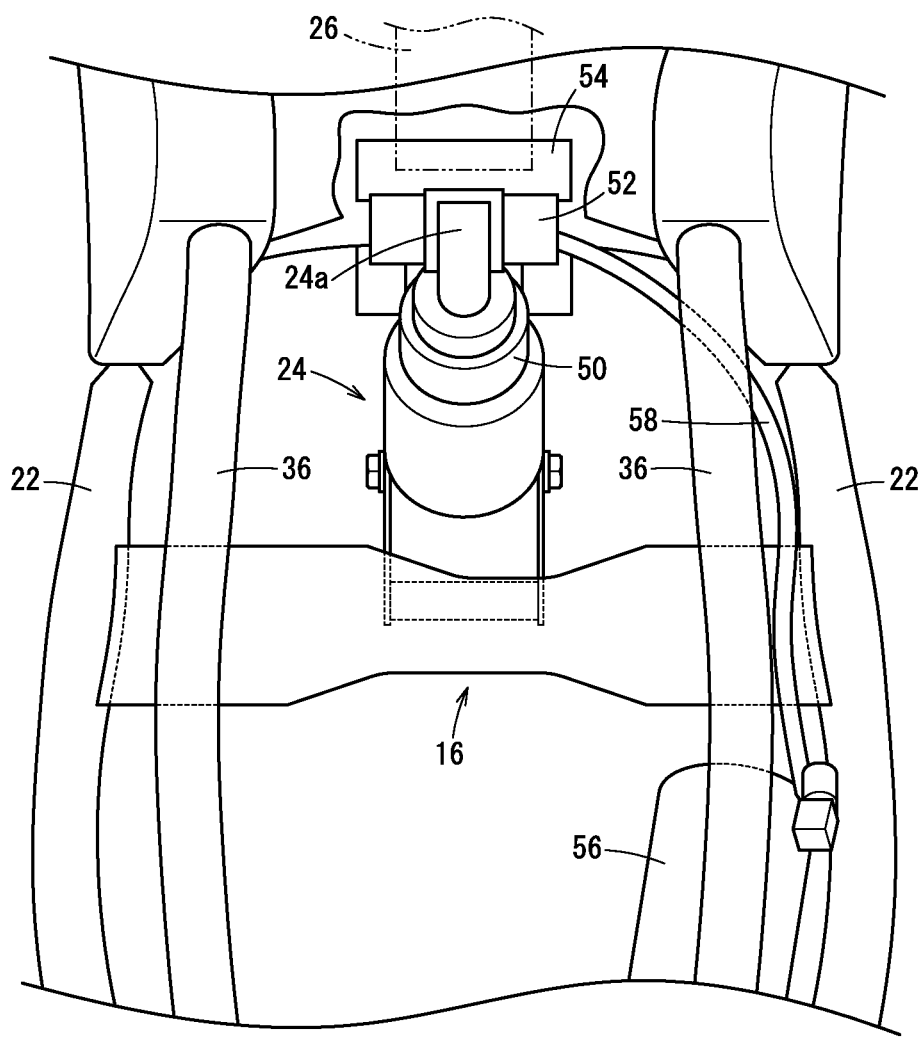
FIG. 4 is an enlarged top view showing the vicinity of the hydraulic hose of FIG. 3.
Figure 4:
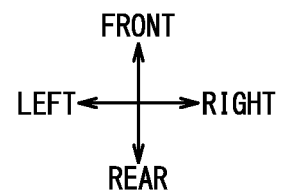

Moreover, as shown in FIGS. 3 and 4, the hydraulic damper 50 is connected via a hydraulic hose 58 to a reservoir tank 56 storing the hydraulic oil, and the hydraulic oil in the reservoir tank 56 is supplied to inside an unillustrated spring pre-load adjustment cylinder chamber. This reservoir tank 56 is disposed on a rearward side with respect to the rear suspension 24. The hydraulic hose 58 has its front end portion connected to a forward side of the hydraulic damper 50, and after having been led out to a right side in the vehicle width direction from below the later-mentioned solenoid valve 52, extends rearwards along the seat frame 36 on the right side in the vehicle width direction to have its rear end portion connected to the reservoir tank 56.

Furthermore, as shown in FIGS. 2 to 4, in the one end portion of the hydraulic damper 50 on an upper side, the solenoid valve 52 and the sub-tank 54 are provided side by side at a position on a forward side. The solenoid valve 52 is connected to an unillustrated controller, and is provided so as to freely open/close based on a control signal from the controller.

The sub-tank 54, which is formed extending in the vehicle width direction with a circular-shaped cross section, for example, is disposed further to a forward side and more downwardly than the solenoid valve 52, and is connected to the cylinder chamber (not illustrated) of the hydraulic damper 50 via unillustrated hydraulic piping.

Moreover, by the solenoid valve 52 being inputted with a control signal from the unillustrated controller, the solenoid valve 52 opens/closes, and the flow rate of the hydraulic oil in the cylinder chamber of the hydraulic damper 50 is controlled.

In the above-mentioned rear suspension 24, as shown in FIGS. 1 and 2, when the swing arm 22 has swung upwardly/downwardly with the pivot shaft 44 as a fulcrum, the unillustrated piston rod and the piston make a stroke along the cylinder chamber filled with the hydraulic oil, whereby the coil spring 48 expands/contracts according to a stroke quantity of the stroke. A shock or vibration applied to the swing arm 22 through the rear wheel 20 from a road surface, for example, is damped and absorbed by expansion/contraction of the hydraulic damper 50.

The detection sensor 26, which is a gyro sensor capable of detecting behavior of the vehicle body while traveling, for example, is configured capable of detecting movement amount or acceleration around the axis with respect to a front-rear axis, an up-down axis, and a left-right axis, and of outputting the detected movement amount or acceleration to the controller as a detection signal.

As shown in FIGS. 1 to 4, this detection sensor 26 is disposed at a position on a forward side of the one end portion 24a of the rear suspension 24 and below the seat 38 and fuel tank 40, and is disposed more forwardly than the pivot shaft 44 axially supporting the swing arm 22.

Moreover, the detection sensor 26 is disposed or extends even more to the forward side than the sub-tank 54 which is positioned on the most forward side in the rear suspension 24. By the detection sensor 26 being thus disposed at a position on a forward side of the forwardly inclined rear suspension 24 and below the seat 38 and fuel tank 40, it results in the detection sensor 26 being disposed at a position closer to the center-of-gravity of the saddle-riding type vehicle 10.

In other words, as shown in FIG. 4, in a top view of the saddle-riding type vehicle 10 viewed from above, the detection sensor 26 is disposed so as to overlap with the sub-tank 54 of the rear suspension 24.

Moreover, during traveling of the saddle-riding type vehicle 10, each of detection values of the likes of the movement amount or acceleration around each of the axes detected by the detection sensor 26 are outputted to the controller (not illustrated) as the detection signal. As a result, current behavior (vehicle body attitude) in the saddle-riding type vehicle 10 is calculated, and the solenoid valve 52 is opened/closed based on the behavior (each of the detection values), whereby the flow rate of the hydraulic oil in the hydraulic damper 50 is controlled. As a result, damping of the hydraulic damper 50 is adjusted according to behavior of the vehicle body, and the shock or vibration inputted to the swing arm 22 from the rear wheel 20 is suitably absorbed.

As indicated above, in the present embodiment, the saddle-riding type vehicle 10 is provided with: the vehicle body frame 16; the swing arm 22 supported in a swingable manner with respect to the pivot frame 34 of the vehicle body frame 16; the rear suspension 24 coupled to the link arm 46 and the pivot frame 34, which are connected to the swing arm 22; and the detection sensor 26 that detects behavior of the vehicle body during traveling of the saddle-riding type vehicle 10, wherein, in a top view of the saddle-riding type vehicle 10 viewed from above, the detection sensor 26 is disposed so as to overlap with the sub-tank 54 of the rear suspension 24.

Thus, by the detection sensor 26 being disposed close to the rear suspension 24 which is provided in a vicinity of the center-of-gravity of the saddle-riding type vehicle 10, and, moreover, by the detection sensor 26 being disposed close also to the sub-tank 54 that stores the hydraulic oil and has an increased weight, the detection sensor 26 can be disposed at a position closer to the center-of-gravity. Therefore, it becomes possible for behavior of the vehicle body to be more highly accurately detected by the detection sensor 26.

Moreover, the rear suspension 24 is fitted in a state of being forwardly inclined such that the one end portion 24a on its upper side will be on a front side, and the other end portion 24b on its lower side will be on a rear side, and, furthermore, the sub-tank 54 is provided so as to be on a forward side of the rear suspension 24. Hence, by configuring as a frontward side a one end portion 24a side of the rear suspension 24 whose weight is increased by being provided with the sub-tank 54 storing the hydraulic oil, the center-of-gravity of the saddle-riding type vehicle 10 can be configured on a frontward side, and, moreover, by the sub-tank 54 being disposed downwardly with respect to the rear suspension 24, a center-of-gravity position of the saddle-riding type vehicle 10 can be further lowered to increase stability and a touching-the-ground sensation.

Furthermore, by the detection sensor 26 being disposed between the seat 38 mounted on the seat frame 36 of the vehicle body frame 16, and the sub-tank 54 of the rear suspension 24, it becomes possible for it to be prevented that flying stones or the like thrown up from the road surface end up contacting the detection sensor 26, and for the detection sensor 26 to be suitably protected, during traveling of the saddle-riding type vehicle 10, for example.

Further still, by the detection sensor 26 being disposed more downwardly than the fuel tank 40 fixed to the vehicle body frame 16, the detection sensor 26 can be brought closer to the center-of-gravity position below the fuel tank 40 whose weight is increased by storing the fuel. Moreover, it can be prevented that flying stones or the like thrown up from the road surface end up contacting the detection sensor 26, and the detection sensor 26 can be suitably protected, during traveling of the saddle-riding type vehicle 10, for example.

Moreover, by the detection sensor 26 being disposed forward of the pivot shaft 44, the detection sensor 26 is less easily affected by a swinging operation of the swing arm 22 supported by the pivot shaft 44, and it becomes possible for behavior of the vehicle body to be stably and highly accurately detected by the detection sensor 26.

Note that the saddle-riding type vehicle 10 according to the present invention is not limited to the above-mentioned embodiment, and it goes without saying that a variety of configurations may be adopted therefor, without departing from the gist of the present invention.

What is claimed is:

1. A saddle-riding vehicle comprising: a vehicle body frame; a suspension in which a swing arm supported in a swingable manner with respect to the vehicle body frame and the vehicle body frame are coupled, and damping is controlled by a hydraulic oil; a tank unit provided in the suspension and storing the hydraulic oil; and a sensor that detects behavior of a vehicle body while traveling,
    wherein, in a top view of the saddle-riding vehicle, the tank unit and the sensor are disposed so as to overlap with each other, and
    the sensor is disposed above an upper end of the tank unit.

2. The saddle-riding vehicle according to claim 1, wherein the suspension is fitted in a forwardly inclined state to the vehicle body frame, and the tank unit is provided on a forward side of the suspension.

3. The saddle-riding vehicle according to claim 1, comprising a seat mounted on the vehicle body frame,
    wherein the sensor is disposed between the seat and the tank unit.

4. The saddle-riding vehicle according to claim 1, wherein the sensor is disposed more forwardly than a pivot shaft that supports the swing arm in a swingable manner with respect to the vehicle body frame.

5. The saddle-riding vehicle according to claim 1, wherein the sensor is a gyro sensor.

6. A saddle-riding vehicle comprising: a vehicle body frame; a suspension in which a swing arm supported in a swingable manner with respect to the vehicle body frame and the vehicle body frame are coupled, and damping is controlled by a hydraulic oil; a tank unit provided in the suspension and storing the hydraulic oil; and a sensor that detects behavior of a vehicle body when traveling,
    wherein, in a top view of the saddle-riding vehicle, the tank unit and the sensor are disposed so as to overlap with each other,
    the saddle-riding vehicle further comprises a fuel tank fixed to the vehicle body frame and storing a fuel,
    wherein the sensor is provided below the fuel tank.

7. The saddle-riding vehicle according to claim 6, wherein the sensor is a gyro sensor.

\* \* \* \* \*